United States Patent [19]
Arai

[11] Patent Number: 5,898,512
[45] Date of Patent: Apr. 27, 1999

[54] LINK ESTABLISHING SYSTEM AND LINK ESTABLISHING METHOD

[75] Inventor: Masahiro Arai, Tokyo, Japan

[73] Assignee: NEC Corporation, Tokyo, Japan

[21] Appl. No.: 08/797,061

[22] Filed: Feb. 12, 1997

[30] Foreign Application Priority Data

Feb. 13, 1996 [JP] Japan .................................. 8-025305

[51] Int. Cl.$^6$ .......................... H04B 10/08; H04B 10/00
[52] U.S. Cl. ........................ 359/110; 359/158; 359/177; 359/113
[58] Field of Search .................... 359/143, 177, 359/158, 110, 152, 113

[56] References Cited

U.S. PATENT DOCUMENTS 5,491,572  2/1996  Ohara ...................................... 359/110
5,654,815  8/1997  Bunse ...................................... 359/158

FOREIGN PATENT DOCUMENTS 63-9705  3/1988  Japan .

OTHER PUBLICATIONS

"Draft Proposed International Standard—Fiber Channel—Physical and Signalling Interface", issued by ISO, Jul. (1995), pp. 71–89.

Primary Examiner—Kinfe-Michael Negash
Attorney, Agent, or Firm—Foley & Lardner

[57] ABSTRACT

A link establishing system according to the present invention is constituted by connecting between an upper device and a lower device a pair of optical transmission devices which have the same configuration and are connected with each other through an optical fiber. The optical transmission device is provided with an optical signal/electric signal converting circuit for determining an optical signal transmitted from a remote device as a receive signal, an optical signal detecting circuit for outputting an optical detection signal R1 indicating a result of detecting the receive signal, a byte-synchronous circuit for detecting a synchronous pattern from the receive signal and achieving byte-synchronism to output a synchronism establishment signal C1, and a link detecting circuit for detecting link establishment to output a link establishment signal L1 based on the signals R1 and C1. A monitoring circuit outputs a link establishment informing signal LX to a upper device and a lower device when the link establishment signals L1 and L2 are detected from the both optical transmission devices.

4 Claims, 3 Drawing Sheets

LINK ESTABLISHING SYSTEM AND LINK ESTABLISHING METHOD

BACKGROUND OF THE INVENTION

1. Field of the Invention

The present invention relates to a link establishing system and a link establishing method for confirming whether bi-directional data transmission is enabled through a pair of optical transmission devices connected to each other between a first device and a second device.

2. Description of the Related Art

As a technology associated with this type of link establishing system, there is a synchronizing system or the like disclosed in, e.g., Japanese Patent Application Publication No. Sho 63-9705 and "DRAFT PROPOSED INTERNATIONAL STANDARD—Fiber channel—Physical and Signalling Interface", pp. 71–89, issued by ISO. As shown in FIG. 3, such a synchronizing system is constituted by a pair of optical transmission devices 33 and 34 connected with each other through an optical fiber 41 between an upper device 31 and a lower device 32, and judgment is made upon whether the bi-directional data transmission is possible between the upper device 31 and the lower device 32 by executing a process called "handshake" through the optical transmission devices 33 and 34.

In this synchronizing system, in order to execute the handshake process, a specific pattern is first generated by a specific pattern generating circuit 42 of the optical transmission device 33 in the upper device 31, and the specific pattern is converted into an optical signal using an electric signal/optical signal converting circuit 36, the converted optical signal being transmitted to the optical transmission device 34 in the lower device 32 via the optical fiber 41 in accordance with the timing of a clock signal fed from a clock generating circuit 40.

In the optical transmission device 34, the optical signal supplied from the upper device 31 is received by an optical signal/electric signal converting circuit 38, and the optical signal is thereby converted into an electric signal as a receive signal. The receive signal is input to a specific pattern detecting circuit 43 that makes judgment upon whether a specific pattern is included in the receive signal and outputs a receive data signal indicating the result of the judgment. Although the receive data signal is input to a response circuit 44, the receive data signal is transmitted to the electric signal/optical signal converting circuit 36 if the receive data signal indicates that the specific pattern has been detected. The electric signal/optical signal converting circuit 36 converts the receive data signal into an optical signal, the optical signal being returned to the upper device 31 over the optical fiber 41 in accordance with a timing of the clock signal from the clock generating circuit 40.

In the optical transmission device 33 in the upper device, the optical signal fed from the lower device 32 is subsequently received in the optical signal/electric signal converting device 38 and converted into an electric signal as a receive signal. The receive signal is input to a specific pattern detecting circuit 43 that detects if a specific pattern is included in the receive signal or not.

If the specific pattern is detected in the specific pattern detecting circuit 43, it is possible to confirm the following states. That is, the optical transmission device 33 in the upper device 31 can appropriately perform transmission; the specific pattern fed from the upper device 31 can be appropriately received by the optical transmission device 34 in the lower device 32; the optical transmission device 34 can adequately effect transmission; and the optical transmission device 33 in the upper device 31 can adequately carry out reception. It has been therefore confirmed that the bi-directional data transmission is possible between the upper device 31 and the lower device 32, thereby establishing the link.

It is to be noted that a transmitting circuit 37, a receiving circuit 35 and a synchronizing signal extracting circuit 39 in each of the optical transmission devices 33 and 34 function when actually transmitting data between the upper device 31 and the lower device 32 in the bi-directional manner after establishing the link.

In case of the above-mentioned synchronizing system (link establishing system), the specific pattern generating circuit is provided to the optical transmission device in the upper device and the handshake for sending/receiving the specific pattern between the upper device and the lower device is effected to establish the link, which makes the processing procedure to establish the link troublesome, thus enlarging and complicating the circuit configuration required in the optical transmission device.

Further, there is a difference between the upper device and the lower device in provision of the specific pattern generating circuit in the optical transmission device configuration, and hence sharing of data transmission between the upper device and the lower device is not smoothly ensured, resulting in troublesome and inconvenient design development or maintenance of the optical transmission device.

SUMMARY OF THE INVENTION

In view of the above-described problems, it is therefore an object of the present invention to provide a link establishing method by which a link can be rapidly and rationally established between an upper device and a lower device and sharing of data transmission can be smoothly ensured, and to provide a link establishing system having a simple structure that can be easily maintained, to which the link establishing method is applied.

To achieve this aim, the link establishing method according to one aspect of the present invention confirms the state in which the bi-directional data transmission is possible between a upper device and a lower device through a pair of optical transmission devices connected with each other therebetween. This link establishing method comprises the steps of: detecting link establishment based on at least either a result of detecting a receive signal obtained by electrically converting an optical signal transmitted from a corresponding remote device in a pair of optical transmission devices or a result of establishing synchronism by detecting a synchronous pattern from the receive signal to achieve byte-synchronism; informing to the upper device and the lower device a result of monitoring the link establishment detecting result; and performing control associated with the link establishment detecting operation and control over data transmission through a pair of the optical transmission devices in response to annunciation of a monitoring result.

Furthermore, the link establishing system according to one aspect of the present invention has a pair of optical transmission devices connected with each other through an optical fiber being connected between a upper device and a lower device and establishes a link for confirming that the bi-directional data transmission is possible between the upper device and the lower device. In this link establishing system, each of the pair of optical transmission devices comprises: an optical signal/electric signal converting circuit for receiving an optical signal fed from a corresponding remote device to be converted into and output as a receive signal; an optical signal detecting circuit for outputting an optical detection signal indicating a result of detecting the receive signal; a byte-synchronous circuit for detecting a synchronous pattern from the receive signal and achieving byte-synchronism to output a synchronism establishment signal; and a link detecting circuit for detecting link establishment to output a link establishment signal based on at least either the optical detection signal or the synchronism establishment signal, the upper device and the lower device being connected to a monitoring circuit for detecting a link establishment signal to output a link establishment informing signal.

In this link establishing system, it is preferable that the link detecting circuit outputs a link establishment signal by determining that a transmitting system of a remote system and a receiving system of its own system are appropriately performing operation based on only a synchronism establishment signal, or that the link detecting circuit outputs a link establishment signal by determining that a transmitting system of a remote system and a receiving system of its own system are appropriately performing operation based on both an optical detection signal and a synchronism establishment signal.

Moreover, in the link establishing system, the upper device and the lower device aim to output a link detection control signal directing the link establishment detecting operation to the nearest link detecting circuit in a pair of optical transmission devices, and the monitoring circuit outputs a link establishment informing signal to the upper device and the lower device when the link establishment signal has been detected from the pair of optical transmission devices.

Additionally, in the link establishing system, the link detecting circuit outputs the link establishment signal irrespective of any of the optical detection signal and the synchronism establishment signal after the first link establishment.

In the link establishing system according to these aspects, the link detecting circuit may preferably stop outputting the link establishment signal when the link detection control signal directs to prohibit the link establishment detecting operation.

Further, in the link establishing system, the upper device and the lower device can ensure the link establishing system for controlling data transmission through a pair of optical transmission devices in response to input of the link establishment informing signal.

BRIEF DESCRIPTION OF THE DRAWINGS

Other features and advantages will become apparent from the following detailed description when taken in conjunction with the accompanying drawings, in which.

DETAILED DESCRIPTION OF THE
PREFERRED EMBODIMENT OF THE
INVENTION

The present invention will now be described in detail hereinbelow with reference to the accompanying drawings.

The description will be first given as to the outline of a link establishing method according to the present invention. Although this link establishing method similarly aims to establish a link for confirming that the bi-directional data transmission is possible through a pair of optical transmission devices connected with each other between an upper device and a lower device as in the prior art, the pair of optical transmission devices described herein detect link establishment based on at least either a result of detecting a receive signal obtained by electrically converting an optical signal fed from a device on the other side or a result of detecting a synchronous pattern from the receive signal and achieving byte-synchronism to establish synchronism, a result of monitoring a link establishment detection result being informed to the upper device and the lower device, thereby carrying out control associated with the link establishment detecting operation and control over data transmission via the pair of optical transmission devices in response to the monitoring result annunciation.

According to this link establishing method, the pair of optical transmission devices can be formed of optical nodes having the same configuration, and link establishment is possible without performing the complicated handshake for sending/receiving a specific pattern, which is carried out in the prior art.

Figure 1:
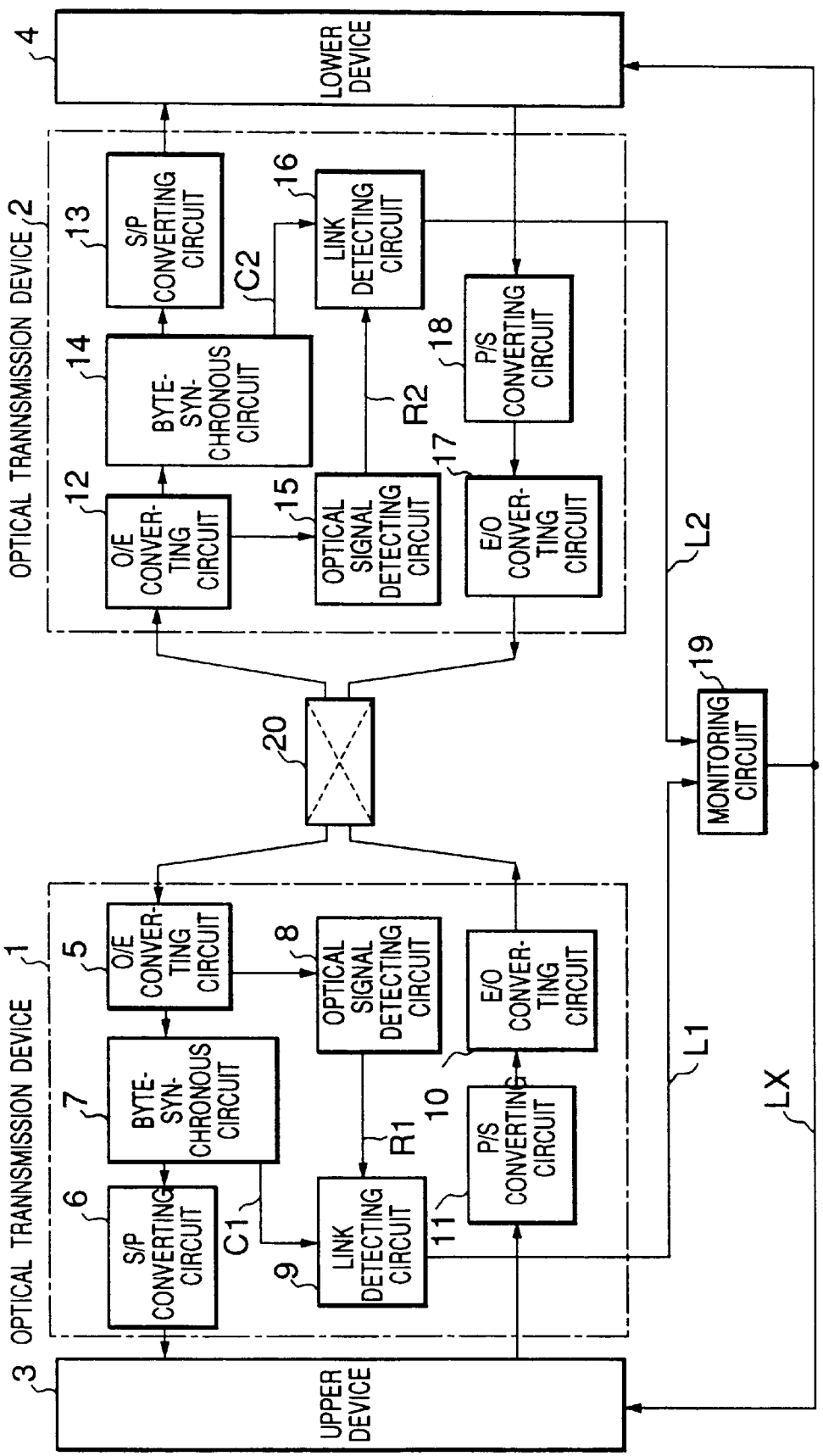
FIG. 1 is a block diagram showing a preferred embodiment of the present invention.

FIG. 1 is a block diagram showing a preferred embodiment according to the present invention.

Figure 3:
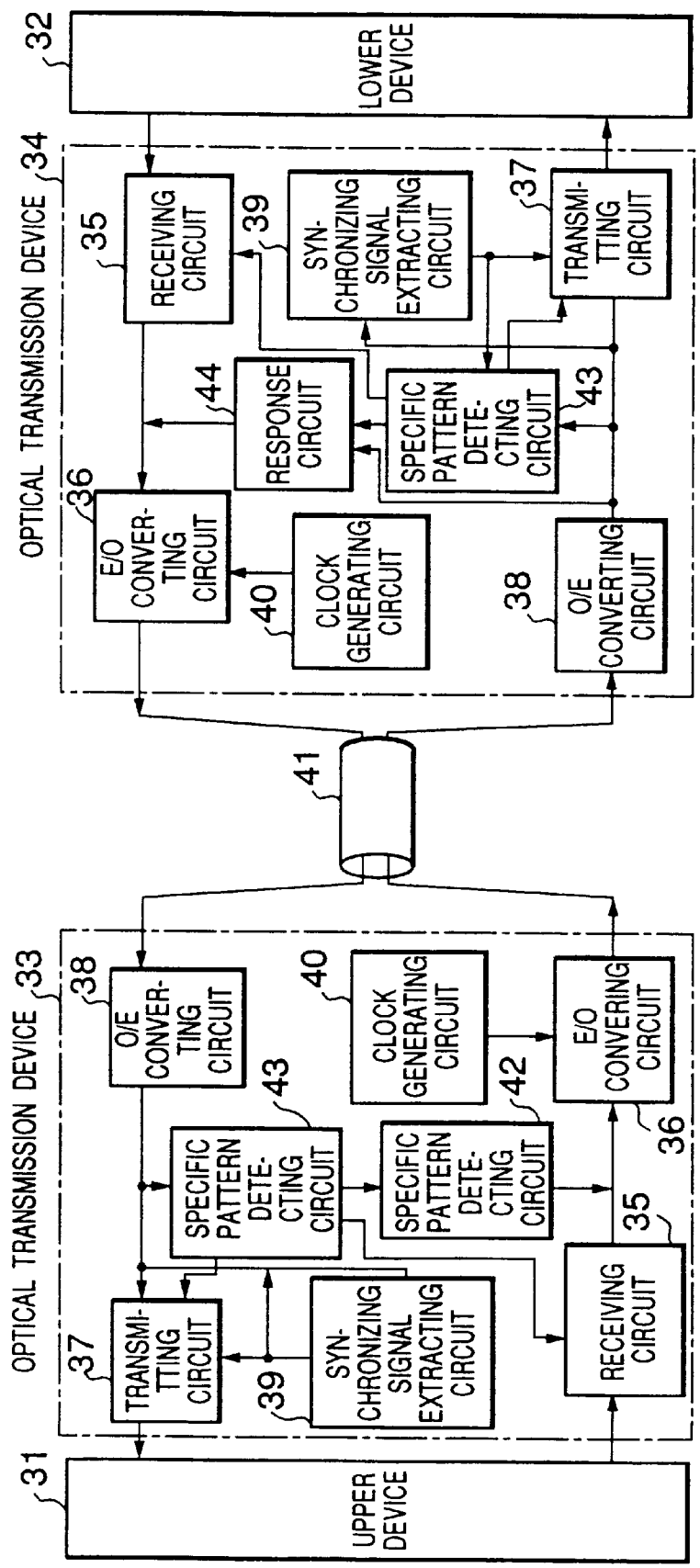
FIG. 3 is a block diagram showing a prior art link establishing system.

As similar to the prior art shown in FIG. 3, this link establishing system also has a pair of optical transmission devices (optical nodes) 1 and 2 connected with each other via an optical fiber 20 being connected between an upper device 3 and a lower device 4 and commonly has the basic configuration and functions for performing link establishment to confirm that the bi-directional data transmission is possible between the upper device 3 and the lower device 4.

The optical transmission device 1 described herein is however provided with: an optical signal/electric signal converting circuit 5 for receiving from a corresponding remote device an optical signal to be converted and output as a receive signal; an optical signal detecting circuit 8 for outputting an optical detection signal R1 indicating a result of detecting the receive signal; a byte-synchronous circuit 7 for outputting a synchronism establishment signal C1 by detecting a synchronous pattern from the receive signal to achieve bite-synchronism; and a link detecting circuit 9 for outputting a link establishment signal L1 by detecting link establishment based on at least either the optical detection signal R1 or the synchronism establishment signal C1. Here, the link detecting circuit 9 however outputs a link establishment signal L1 when it has been judged that a transmitting system of a remote device and a receiving system of its own device are appropriately performing the operation based on only the synchronism establishment signal C1 or both the optical detection signal R1 and the synchronism establishment signal L1.

On the other hand, the optical transmission device 2 is also provided with, as a similar configuration, a optical signal/electric signal converting circuit 12 for receiving from a remote device an optical signal to be converted and output as a receive signal; an optical signal detecting circuit 15 for outputting an optical detection signal R2 representing a result of detecting the receive signal; a byte-synchronous circuit 14 for outputting a synchronism establishment signal C2 by detecting a synchronous pattern from the receive signal to achieve byte synchronism; and a link detecting circuit 16 for outputting a link establishment signal L2 by detecting link establishment based on at least either the optical detection signal R2 or the synchronism establishment signal C2. Here, the link detecting circuit 16 however outputs the link establishment signal L2 when the transmitting system of the remote device and the receiving system of its own device appropriately perform the operation based on only the synchronism establishment signal C2 or both the optical detection signal R2 and the synchronism establishment signal L2.

In the optical transmission device 1, the receiving system is made up of the optical signal/electric signal converting circuit 5, the bite-synchronous circuit 7, the link detecting circuit 9 and a serial/parallel converting circuit 6 for converting serial data fed from the byte-synchronous circuit 7 into parallel data, and the transmitting system is constituted by a parallel/serial circuit 11 for converting transmit data from the upper device 3 from parallel data into serial data and the electric signal/optical signal converting circuit 10 for converting the obtained serial data into an optical signal.

On the other hand, in the optical transmission device 2, the receiving system is made up of, as a similar configuration, the optical signal/electric signal converting circuit 12, the byte-synchronous circuit 14, the link detecting circuit 16 and the serial/parallel converting circuit 13, while the transmitting system is constituted by the parallel/serial circuit 18 for converting transmit data from the lower device 4 into parallel data into serial data and the electric signal/optical signal converting circuit 17 for converting the obtained serial data into an optical signal.

Further, the upper device 3 and the lower device 4 are connected with the monitoring circuit 19 that detects the link establishment signals L1 and L2 to output a link establishment informing signal LX. The monitoring circuit 19 outputs the link establishment informing signal LX to the upper device 3 and the lower device 4 when receiving the link establishment signals L1 and L2 from both the optical transmission devices 1 and 2.

Furthermore, the upper device 3 and the lower device 4 output the link detection control signals to the link detecting circuits 9 and 16 to carry out control associated with link establishment detecting operation and perform data transmission control via the optical transmission devices 1 and 2 in response to input of the link establishment informing signal LX. With the link detection control signals, the link detecting circuits 9 and 16 have functions for outputting the link establishment signals L1 and L2 irrespective of any of the optical detection signal R1, the synchronism establishment signal C1, the optical detection signal R2 and the synchronism establishment signal C2 after the initial link establishment or for stopping output of the link establishment signals L1 and L2 when the link detection control signals direct to prohibit the link establishment detecting operation.

The following describes an example of the link establishing operation by the link establishing system. When a power supply of the system is turned on, the link establishment informing signal LX (as well as the link establishment signals L1 and L2) is invalid because a link is not established between the upper device 3 and the lower device 4, and hence data is not appropriately fed/received (data transmission). When the link establishment informing signal LX is invalid, the upper device 3 and the lower device 4 output as the transmit data for start-up the pseudo parallel data including a synchronous pattern for achieving byte-synchronism to parallel/serial converting circuits 11 and 18 of the optical transmission devices 1 and 2. The pseudo parallel data is however fed to the remote device through the optical signal/electric signal converting circuits 10 and 17 over the optical fiber 20, but the pseudo data is usually distinguished from transmit data, the pseudo data being invalidated in the remote devices.

The upper device 3 then outputs as transmit data for establishing a link the pseudo parallel data including a synchronous pattern for achieving bite synchronism to the parallel/serial converting circuit 11 in the optical transmission device 1, the parallel/serial converting circuit 11 converting the pseudo parallel data into serial data to be output to the electric signal/optical signal converting circuit 10. The electric signal/optical signal converting circuit 10 converts the serial data into an optical signal to be output to the optical transmission device 2 in the lower device 4 over the optical fiber 20.

The optical transmission device 2 receives the optical signal in the optical signal/electric signal converting circuit 12 where the signal is converted into a receive signal to be output. The receive signal is output to the optical signal detecting circuit 15 and the byte-synchronous circuit 14, the optical signal detecting circuit 15 outputting the optical detection signal R2 indicating whether the receive signal is input to receive the optical signal, and the byte-synchronous circuit 14 outputting a synchronism establishment signal C2 representing the state of synchronism establishment by receiving the receive signal and detecting the synchronous pattern from the serial data to achieve byte-synchronism. The serial data whose byte-synchronism has been attained in the byte-synchronous circuit 14 is input to the serial/parallel converting circuit 13 in which the serial data is converted into the parallel data to be transmitted to the lower device 4.

The link establishing circuit 16 to which the optical detection signal R2 and the receive synchronism establishment signal C2 are input outputs the link establishment signal L2 indicating that the link is established because the optical transmission device 2 can appropriately receive data from the upper device 3 if the signals R2 and C2 represents reception of the optical signal and synchronism establishment.

Similarly, the lower device 4 outputs as transmit data for establishing a link the pseudo parallel data including a synchronous pattern for achieving byte-synchronism to the parallel/serial converting circuit 18 in the optical transmitting device 2, the parallel/serial converting circuit 18 converting the pseudo parallel data into serial data to be output to the electric signal/optical signal converting circuit 17. The electric signal/optical signal converting circuit 17 converts the serial data into an optical signal to be fed to the optical transmission device 1 in the upper device 3 over the optical fiber 20.

The optical transmission device 1 receives in the optical signal/electric signal converting circuit 5 the optical signal to be converted into and output as a receive signal. The receive signal is output to the optical signal detecting circuit 8 and the byte-synchronous circuit 7, the optical signal detecting circuit 8 receiving the receive signal and outputting an optical detection signal R1 representing whether the optical signal has been received, and the byte-synchronous circuit 7 outputting the synchronism establishment signal C1 indicating the state of synchronism establishment by receiving the receive signal and detecting the synchronous pattern from the serial data to achieve byte synchronism. The serial data whose byte-synchronism has been achieved in the byte-synchronous circuit 7 is input to the serial/parallel converting circuit 6 where the serial data is converted into the parallel data to be sent to the upper device 3.

The link establishing circuit 9, to which the optical detection signal R1 and the receive synchronism establishment signal C1 have been input, outputs the link establishment signal L1 indicating that the link is established because the optical transmission device 1 can correctly receive data from the lower device 4 if the signals R1 and C1 indicate reception of the optical signal and synchronism establishment.

When the link establishment signals L1 and L2 are transmitted, the monitoring circuit 19 recognizes that: the upper device 3 appropriately transmits data; the lower device 4 appropriately receives data; the lower device 4 adequately transmits data; and the upper device 3 adequately receives data. Since it has been already confirmed that bi-directional data transmission is possible between the upper device 3 and the lower device 4, a link can be established. The monitoring device 19 then transmits the link establishment informing signal LX to the upper device 3 and the lower device 4. Upon receiving the link establishment informing signal LX from the monitoring device 19, the upper device 3 and the lower device 4 start to transmit the normal transmit data to the corresponding remote devices, respectively. The upper device 3 and the lower device 4 thereby start the processing for the receive data therein with the receive data fed from the remote device as valid data.

Figure 2:
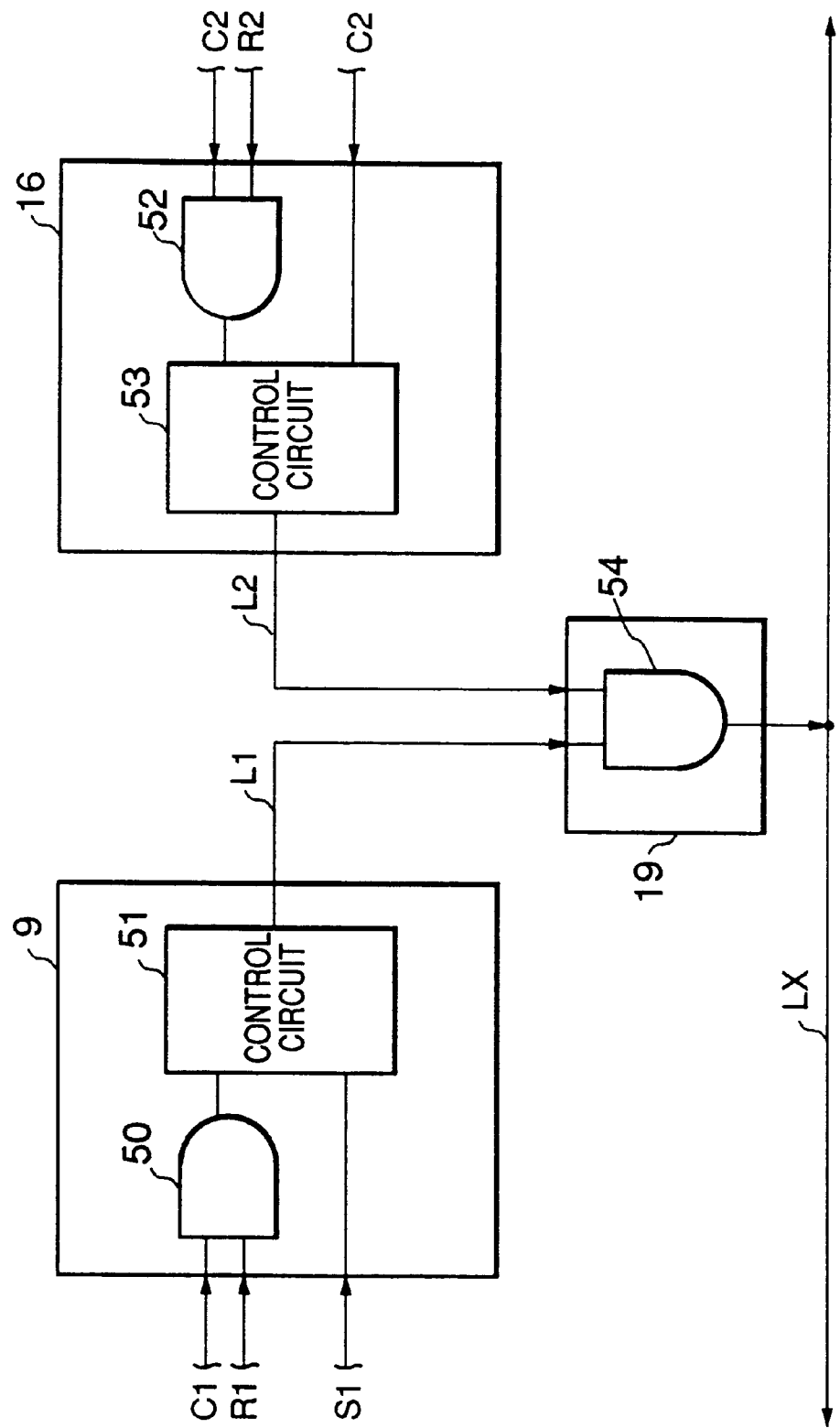
FIG. 2 is a circuit diagram showing a primary part of the preferred embodiment.

The link detecting circuits 9 and 16 and the monitoring circuit 19 in this embodiment will now be described in detail with reference to FIG. 2.

Here, the link detecting circuit 9 is provided with an AND circuit 50 for obtaining a logical product of the synchronism establishment signal C1 and the optical detection signal R1 and a control circuit 51 for controlling a result of operation of the AND circuit 50 by the link detection control signal S1 to output the link establishment signal L1, and the link detecting circuit 16 is similarly provided with an AND circuit 52 for obtaining a logical product of the synchronism establishment signal C2 and the optical detection signal R2 and a control circuit 53 for outputting a link establishment signal L2 by controlling a result of operation of the AND circuit 52 using a link detection control signal S2. The monitoring circuit 19 includes an AND circuit 54 for calculating a logical product of the link establishment signals L1 and L2 to output the link establishment informing signal LX.

To the link detecting circuit 9 are input the optical detection signal R1 indicating the state of detecting the optical signal and the synchronism establishment signal C1 indicating the state of establishing the synchronous pattern. The optical detection signal R1 becomes valid when the optical signal is detected, and it becomes invalid when the optical signal is not detected. The synchronism establishment signal C1 becomes valid when the synchronous pattern has been established as expected, and it becomes invalid when the pattern is not established. The optical detection signal R1 and the synchronism establishment signal C1 are input to the AND circuit 50, and a result of logical multiply becomes true when the both signals are valid. The link detection control signal S1 is turned to be valid when obtaining the link state if the logical product is true, and it is turned to be invalid when resetting the link-established state. The link detection control signal S1 is turned to be valid for obtaining the link state because no link is established immediately after the power supply is turned on.

The control circuit 51 receives a result of arithmetic operation by the AND circuit 50 and the link detection control signal S1. Here, the link establishment signal L1 is turned to be valid when the AND circuit 50 once becomes true if the link detection control signal S1 is valid, and the link establishment signal L1 is maintained to be valid even through a result of logical multiply thereafter varies. That is because the synchronous pattern may not be detected at transmission as expected and a protection function must be constructed so as not to consider that link establishment is failed. Further, the link establishment signal L1 is turned to be invalid irrespective of a result of operation effected by the AND circuit 50 when the link detection control signal S1 is invalid.

Meanwhile, the link detecting circuit 16 similarly operates, and the control circuit 53 makes the link establishment signal L2 valid when the AND circuit 52 once becomes true if the link detection control signal S2 is valid and maintains the link establishment signal L2 to be valid even though a result of logical multiply thereafter varies. In addition, the link establishment signal L2 is turned to be invalid irrespective of a result of operation performed by the AND circuit 52 when the link detection control signal S2 is invalid.

The monitoring circuit 19 then receives the link establishment signals L1 and L2 and obtains a logical product of these signals in the AND circuit 54. A result of operation effected by the AND circuit 54 becomes true if the link establishment signals L1 and L2 are valid, and the link establishment informing signal LX is output to the upper device 2 and the lower device 4.

As mentioned above, according to the present invention, the optical transmission device can be formed of an optical node having the same structure in both the upper device and the lower device, and the following two states can be determined by confirming the transmit data from the corresponding remote device. Namely, the two states are: the upper device can appropriately receive data transmitted from the lower device; and the lower device can appropriately receive data fed from the upper device. The monitoring circuit thereby makes judgment upon whether a link is established, which enables the link establishment for confirming the state where the bi-directional data transmission is possible between the upper device and the lower device by a simple circuit configuration without requiring the complicated handshake. The sharing of data by the upper device and the lower device can be therefore achieved. As a result, design development or maintenance of the optical transmission device can be also simplified.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A link establishing method for confirming whether bi-directional data transmission is possible between a first optical transmission device connected to a first device and a second optical transmission device connected to a second device, said first and second optical transmission devices being connected by a bi-directional optical transmission line, said method comprising the steps of:

sending a first optical synchronization pattern signal from said first optical transmission device to said second optical transmission device, and sending a second optical synchronization pattern signal from said second optical transmission device to said first optical transmission device;

detecting said second optical synchronization pattern signal in said first optical transmission device, and detecting said first optical synchronization pattern signal in said second transmission device;

trying to establish synchronism on the basis of said second optical synchronization pattern signal in said first optical transmission device, and trying to establish synchronism on the basis of said first optical synchronization pattern signal in said second optical transmission device;

sending a first synchronism establishment signal from said first optical transmission device to a monitoring circuit, which is independent of said first and second optical transmission devices, if said second optical synchronization pattern signal is detected and if said synchronism is established in said first optical transmission device, and sending a second synchronism establishment signal from said second optical transmission device to said monitoring circuit if said first optical synchronization pattern signal is detected and if said synchronism is established in said second optical transmission device; and sending a link establishment signal from said monitoring circuit to said first and second devices to notify them that data transmission between them has become possible when said monitoring circuit receives both of said first and second synchronism establishment signals.

2. A link establishing system comprising:

a first optical transmission device connected to a first device;

a second optical transmission device connected to a second device;

a bi-directional optical transmission line connecting said first and second optical transmission devices; and a monitoring circuit being independent from said first and second optical transmission devices;

said first optical transmission device including:

first synchronization pattern output means for sending a first optical synchronization pattern signal to said second optical transmission device;

first synchronous means for trying to establish synchronism on the basis of a second optical synchronization pattern signal sent from said second optical transmission device; and first synchronism establishment signal output means for sending a first synchronism establishment signal to said monitoring circuit if said synchronism is established by said first synchronous means;

said second optical transmission device including:

second synchronization pattern output means for sending said second optical synchronization pattern signal to said first optical transmission device;

second synchronous means for trying to establish synchronism on the basis of said first optical synchronization pattern signal sent from said first optical transmission device; and second synchronism establishment signal output means for sending a second synchronism establishment signal to said monitoring circuit if said synchronism is established by said second synchronous means;

wherein said monitoring circuit sends a link establishment signal to said first and second devices to notify them that data transmission between them has become possible when said monitoring circuit receives both of said first and second synchronism establishment signals.

3. A link establishing system as claimed in claim 2, wherein said first and second synchronism establishment signal output means continue to send said first and second synchronism establishment signals to said monitoring circuit once said synchronism is established by said first and second synchronous means, respectively.

4. A link establishing system as claimed in claim 3, wherein said first and second synchronism establishment signal output means stop the sending of said first and second synchronism establishment signals to said monitoring circuit when receiving first and second control signals from said first and second devices, respectively.

* * * * *